Sept. 14, 1954  F. D. TOOHEY  2,689,135
FOLDING VEHICLE FOR CHILDREN
Filed June 19, 1952  3 Sheets-Sheet 1

INVENTOR
FRANCIS D. TOOHEY
BY Owen W. Kennedy
ATTORNEY

Sept. 14, 1954  F. D. TOOHEY  2,689,135
FOLDING VEHICLE FOR CHILDREN
Filed June 19, 1952  3 Sheets-Sheet 2

INVENTOR
FRANCIS D. TOOHEY
BY Owen W. Kennedy
ATTORNEY

Sept. 14, 1954  F. D. TOOHEY  2,689,135
FOLDING VEHICLE FOR CHILDREN
Filed June 19, 1952  3 Sheets-Sheet 3

INVENTOR
FRANCIS D. TOOHEY
BY Owen W. Kennedy
ATTORNEY

Patented Sept. 14, 1954

2,689,135

UNITED STATES PATENT OFFICE 2,689,135

FOLDING VEHICLE FOR CHILDREN

Francis D. Toohey, Gardner, Mass., assignor to O. W. Siebert Company, Gardner, Mass., a corporation of Massachusetts Application June 19, 1952, Serial No. 294,309

9 Claims. (Cl. 280—41)

1

The present invention relates to children's vehicles, of the type that can be used either as a pushcart or stroller when propelled by a handle, or can be used as a baby walker with the handle and footrest removed.

The object of the present invention is to provide an improved connection between the handle and body of the vehicle, whereby the body parts thereof can be folded into collapsed condition by operations readily performed by the use of one hand and one foot only, thus leaving one arm free for holding the baby, if necessary. The handle is also readily removable from the vehicle frame which is adapted to be latched in an extended condition independently of the handle, should it be desired to use the vehicle as a baby walker, with the footrest also removed.

The above and other objects of the invention will hereinafter more fully appear from the following description, considered in connection with the accompanying drawings, in which, Fig. 1 is a view in side elevation of a vehicle embodying the present invention, with one rear wheel broken away to show the frame construction.

Figure 1:
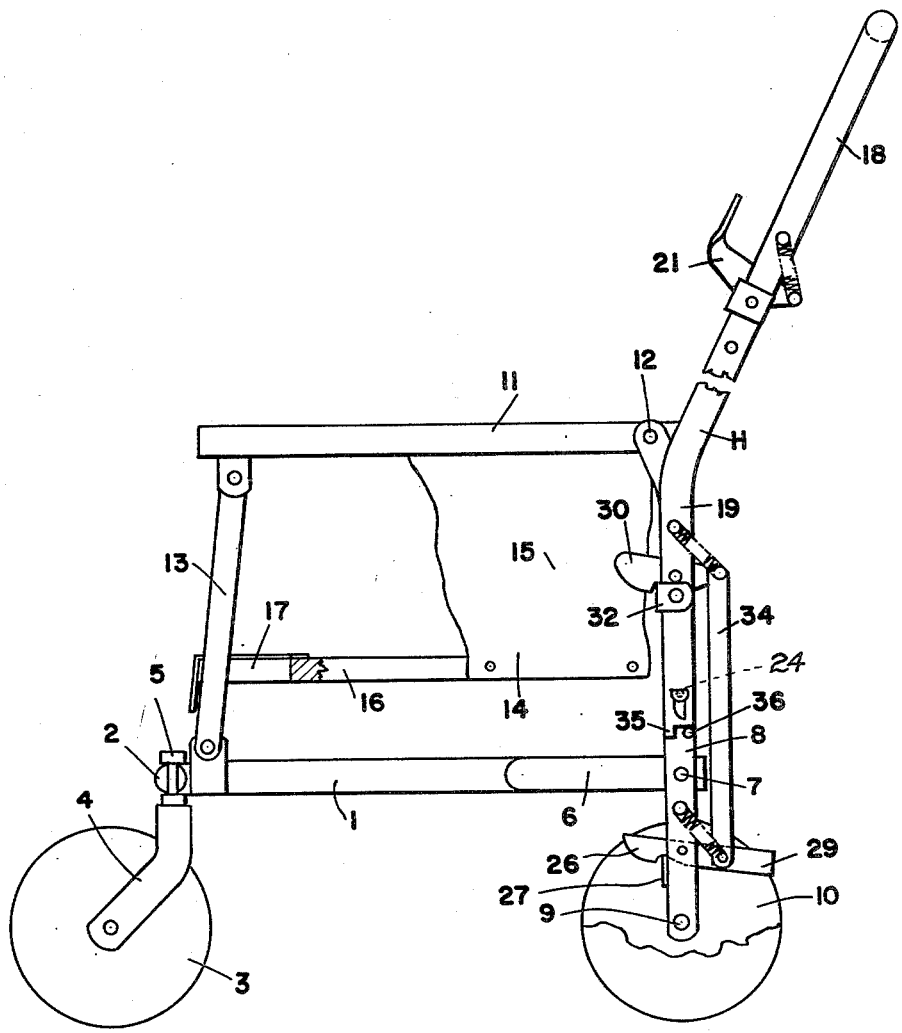
Figure 2:
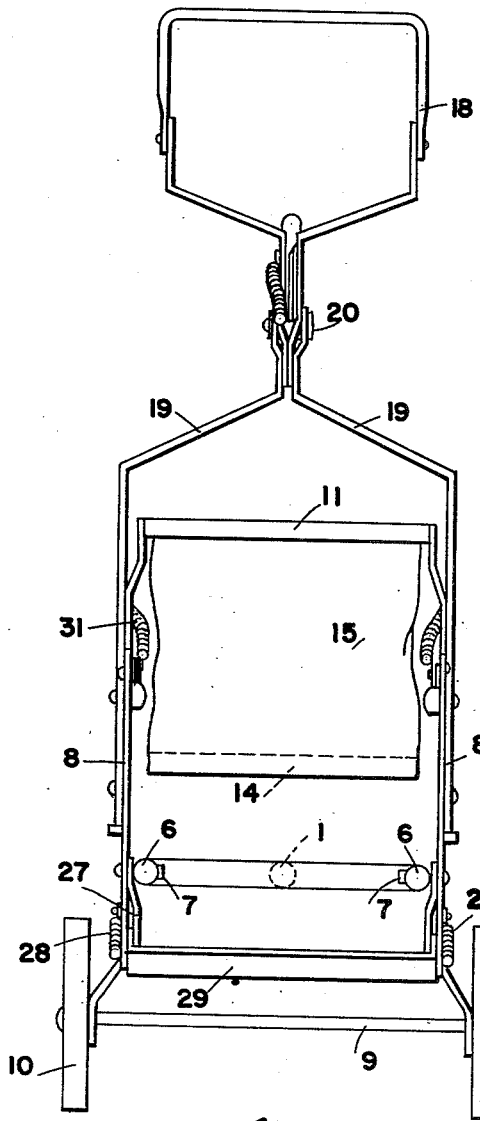
Fig. 2 is a view in rear elevation of the vehicle, shown in Fig. 1.

Referring first to Figs. 1 and 2, the vehicle consists of a base 1 which extends horizontally and provides a cross-bar 2 at its front end to which wheels 3 are attached by means of brackets 4, each turnable about a vertical pivot 5 extending through the bar 2. The rear of the base 1 is in the form of a yoke, the spaced sides 6 of which are connected by pivots 7 to a pair of upwardly extending arms 8, the lower ends of which are turnable about an axle 9 which carries the rear wheels 10.

The upper ends of the arms 8 serve to support the rear portion of a frame 11 by means of pivots 12 which permit relative movement between the frame and the arms. The forward portion of the

2 frame 11 is supported by a link 13 pivotally connected at both ends to the frame 11 and to the base 1. A seat 14 is carried by the frame 11 with the seat hanging freely from the frame 11 by reason of its connection to a band 15 of flexible material, such as fabric, secured around its upper edge to the frame 11. The seat 14 provides a forwardly extending bar 16 that is straddled by the legs of a child occupying the seat, with the front end of the bar 16 having a slot 17 through which the link 13 extends.

Figure 3:
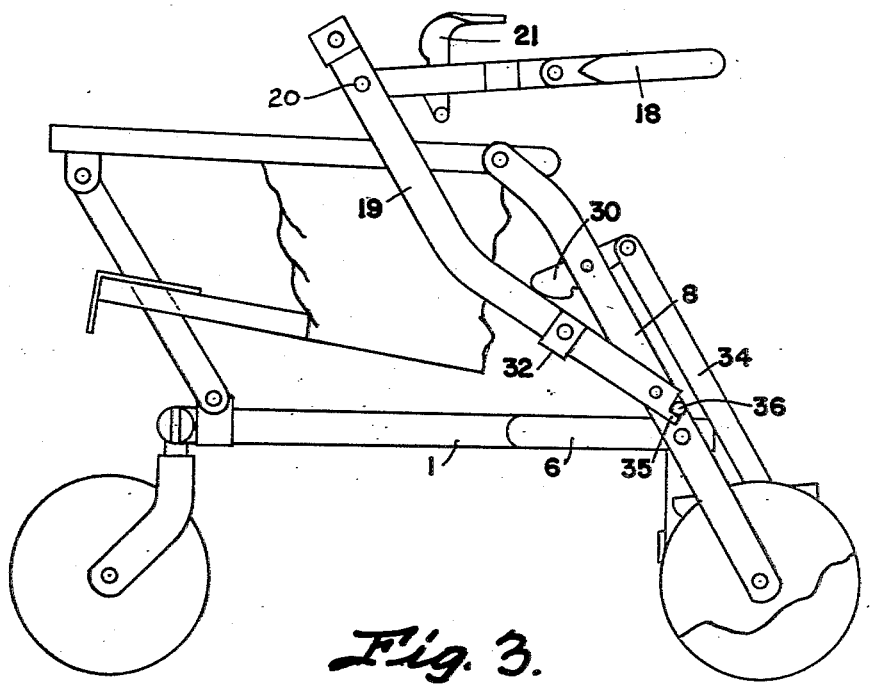
Fig. 3 is a view in side elevation, showing the vehicle of Fig. 1 in a partially collapsed condition.
Figure 4:
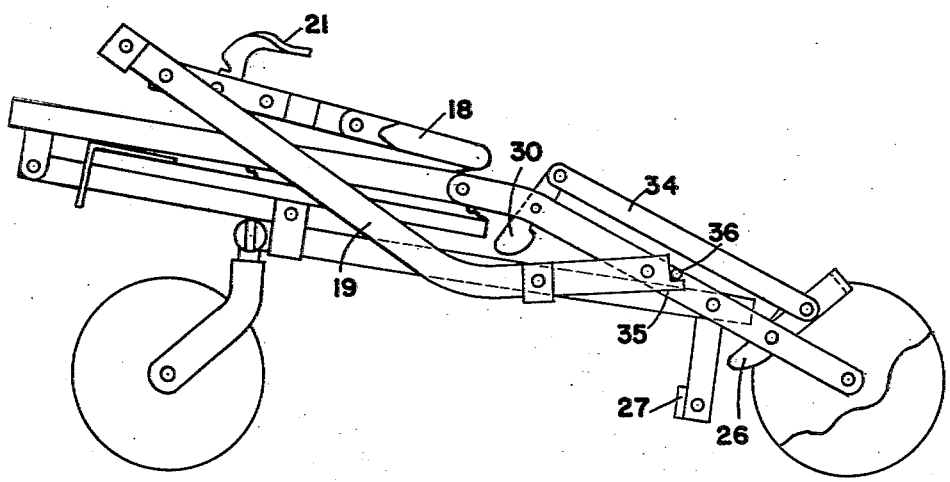
Fig. 4 is a view in side elevation, showing the vehicle of Fig. 1 in a fully collapsed condition.

It will be apparent from the foregoing description of the various parts of the vehicle that the body thereof, as represented by the frame 11, seat 14 and band 15, can be folded downwardly upon the base 1 by turning the arms 8 about the axle 9, this folding operation being illustrated, as partially completed, in Fig. 3. Generally speaking, the construction described thus far is usual in folding vehicles of this general type and the present invention is largely concerned with an arrangement whereby the folding of the body members into the collapsed condition of Fig. 4 is accomplished by means of a handle H connected to the arms 8 in such manner that a continuous downward movement thereof will result in completely collapsing the vehicle.

Figure 6:
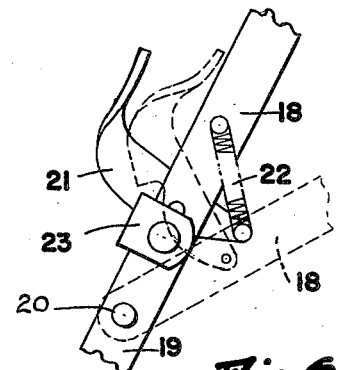
Fig. 6 is a fragmentary view illustrating the construction, which permits folding of a separate grip portion of the handle.

As will be seen from a comparison between Fig. 1 and Fig. 3, the handle H is made in two parts, with one handle part comprising a grip 18 and the other part comprising a pair of arms 19 that are connected to the grip 18 by a pivot 20. A latch 21 pivoted on the grip 18 serves to hold the grip in alignment with the arms 19, with the latch 21 being normally held by a spring 22 in engagement with a latch plate 23 mounted on the arms 19. By turning the latch 21 into the dotted line position of Fig. 6, the release of the latch permits the grip 18 to be swung downwardly at an angle to the arms 19 in preparation for initiating the folding of the vehicle, as shown in Fig. 3.

Figure 5:
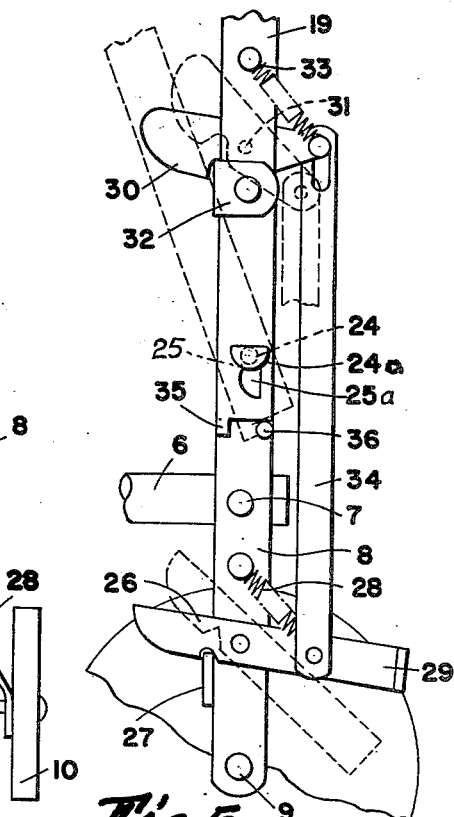
Fig. 5 is a fragmentary view upon an enlarged scale, showing the relation between parts of the frame and the handle, as well as the double latching mechanism for holding the parts in extended condition.

The arms 19 which form the lower part of the handle H are connected by pivots 24 to the arms 8 which extend upwardly from the axle 9. These pivots 24 are freely received in slots 25 at the ends of the handle arms 19, so that the arms 19 can be turned independently of the arms 8, and if desired, can be removed from these arms by bodily shifting the handle to bring enlarged portions 25a of the slots 25 into register with heads 24a on the pivots 24, as shown in Fig. 5.

Fig. 1 shows the relation between the parts when the vehicle is being used as a pushcart or stroller, with the handle H fully extended. In this condition of the vehicle, the arms 8 which support the seat frame 11 are locked in a substantially vertical position by means of a pair of latches 26 turnable on the arms 8 so as to engage latch plates 27, extending downwardly from ends of the arms 6 on the base 1. A spring 28 serves to hold each latch 26 in the position of Fig. 1, with the two latches 26 being connected together by a push bar 29 extending across the rear of the vehicle, as shown in Fig. 2, so that the bar may be engaged and swung downwardly by foot pressure.

In order to hold the arms 19 of the handle H in a substantially vertical position, a second pair of latches 30 are turnable about pivots 31 on the arms 8. Each latch 30 cooperates with a latch plate 32 fixed on an arm 19, and the latches 30 are normally held in engagement with the plates 32 by springs 33. Therefore, the latches 26 and 30 perform the double function of maintaining the arms 8 in vertical position in reference to the base 1, as well as maintaining the handle arms 19 in a vertical position, with reference to the frame arms 8.

It is to be noted that the projecting ends of the upper latches 30 are connected by links 34 to the projecting ends of the lower latches 26 that are joined together by the push bar 29. Therefore, downward movement of the bar 29 by foot pressure will result in simultaneously turning both pairs of latches 26 and 30 in a clockwise direction, as viewed in Fig. 1. When this occurs, both pairs of latches 26 and 30 are released from their latch plates 27 and 32, so that the frame arms 8 are then free to turn about the axle 9, while the handle arms are free to turn about their pivots 24 on the arms 8. However, the mere releasing of the latches 26 and 30 is not sufficient to collapse the vehicle and the present invention is particularly concerned with the action that occurs when the handle H is pushed downwardly, following release of the latches by pressing one foot on the bar 29.

The first step in folding the vehicle resides in releasing the latch 21 so that the grip 18 can be turned about pivot 20 to extend substantially horizontally. Then while still holding down push bar 29 by one foot, the user, while grasping the grip 18 with one hand, pushes forward with the grip. When this occurs, both arms 19 are first free to turn about their pivots 24 on the arms 8 through release of the latches 30, and this turning continues until the arms 19 reach the dotted line position of Fig. 5 to engage a projection 35 at the end of each arm with a pin 36 extending from the side of an arm 8.

Fig. 3 shows the engagement of a projection 35 with a pin 36 as having just occurred, and it is obvious that thereafter any downward movement of the arms 19 will be imparted to the arms 8. Since the arms 8 are free to turn about the pivots 7 on the frame 1, as well as about the axle 9, any further movement of the arms 19, after engagement of the pins 36 with the projections 35, will result in downward movement of the arms 8. In other words, when once the arms 19 are incapable of turning any further about their pivots 24, the arms 19, in effect, become part of the arms 8, in so far as any additional downward movement of the arms 19 is concerned.

Fig. 4 shows the vehicle as having been completely collapsed and it will be seen that in this condition the arms 19 still have their projections 35 in engagement with the pins 36 on the arms 8. However, when it is desired to again extend the vehicle from its collapsed condition, an upward pull applied to the grip 18 will first turn the arms 19 independently of the arms 8 for a short distance until the upper latch plates 32 engage the curved ends of the latches 30. When this occurs, the upwardly moving latch plates 32 exert a camming action on the latches 30 which results in turning the latches until they snap into locking position. Thereafter, the arms 8 will move with the arms 19 until the arms 8 are substantially vertical.

As the arms 8 turn on their pivots 7 from the fully collapsed position of Fig. 4 into the extended position of Fig. 1, curved surfaces on the ends of the latches 26 will engage the latch plates 27 that are fixed to the sides 6 of the base 1. Therefore, as the arms 8 reach a substantially vertical position, the camming action of the latch plates 27 will turn the latches 26 until they snap over the latch plates 27, whereupon the parts will again occupy the position of Fig. 1, wherein both the frame arms 8 and the handle arms 19 are held in alignment with each other by the combined locking action of the latches 26 and 30.

I claim:

1. A folding vehicle of the class described comprising in combination, a base member extending horizontally, wheels mounted at opposite ends of said base member, a pair of arms pivotally mounted on said base member and extending upwardly for supporting a seat frame which is collapsible on said base member in response to downward turning movement of said arms, a pusher handle pivotally mounted on said arms and a fixed abutment on one arm engageable by said handle for imparting pivotal movement of said handle to said arms to collapse the vehicle, upon turning of said handle through a predetermined angle independently of said arms.

2. A folding vehicle of the class described comprising in combination, a base member extending horizontally, wheels mounted at opposite ends of said base member, a pair of arms pivotally mounted on said base member and extending upwardly for supporting a seat frame which is collapsible on said base member in response to downward turning movement of said arms, a pusher handle pivotally mounted on said arms, a fixed abutment on one arm engageable by said handle for imparting pivotal movement of said handle to said arms to collapse the vehicle, upon turning of said handle through a predetermined angle independently of said arms, and means for latching said handle to prevent pivotal movement thereof on said arms when the handle is used as a pusher.

3. A folding vehicle of the class described comprising in combination, a base member extending horizontally, wheels mounted at opposite ends of said base member, a pair of arms pivotally mounted on said base member and extending upwardly for supporting a seat frame which is collapsible on said base member in response to downward turning movement of said arms, a pusher handle pivotally connected to said arms, means for imparting pivotal movement of said handle to said arms to collapse the vehicle, after said handle has been turned through a predetermined angle independently of said arms, means for latching said arms to maintain them in an upright position to hold the seat frame extended, means for latching said handle against pivotal movement on said arms when said handle is used as a pusher, and means for simultaneously unlatching said arms and handle in advance of collapsing the vehicle by downward movement of said handle.

4. A folding vehicle of the class described comprising in combination, a base member extending horizontally, wheels mounted at opposite ends of said base member, a pair of arms pivotally mounted on said base member and extending upwardly for supporting a seat frame which is collapsible on said base member in response to downward turning movement of said arms, a pusher handle pivotally connected to said arms, means for imparting pivotal movement of said handle to said arms to collapse the vehicle after said handle has been turned through a predetermined angle independently of said arms, a first latch for maintaining said arms in upright position with the seat frame extended, a second latch for holding said handle against pivotal movement on said arms and a foot treadle connected to said latches for releasing them in unison to permit movement of said handle to collapse said seat frame in response to movement of said arms therewith.

5. A folding vehicle of the class described comprising in combination, a base member extending horizontally, wheels mounted at opposite ends of said base member, a pair of arms pivotally mounted on said base member and extending upwardly for supporting a seat frame which is collapsible on said base member in response to downward turning movement of said arms, a pusher handle pivotally connected to said arms, a latch mounted on one arm for holding said handle against pivotal movement and a stop fixed on said arm normally spaced from a projection on said handle when the latter is in its latched position, with release of said latch permitting the turning of said handle to engage said projection with said stop and thereafter impart further turning movement of the handle to said arm.

6. A folding vehicle, as set forth in claim 1, in which the handle provides a separate grip portion pivotally connected to the handle and turnable into a position in which it extends at an angle to the handle at the start of the folding operation.

7. A folding vehicle, as set forth in claim 1, in which said handle provides a separate grip portion capable of pivotal movement thereon, and a latch for maintaining said handle and grip portion in alignment when the handle is used as a pusher, with release of said latch permitting said grip portion to be swung into a position in which a push on the grip portion will apply a downward turning force to said handle.

8. A folding vehicle, as set forth in claim 4, in which movement of the parts of the vehicle from a collapsed to an extended position will be accompanied by operation of said latches from a released to a locking position.

9. A folding vehicle, as set forth in claim 4, in which each latch provides a cam portion which is operable to move the latch from a released to a locking position in response to movement of the parts of the vehicle from a collapsed to an extended position.

References Cited in the file of this patent

UNITED STATES PATENTS

| Number | Name | Date |
|---|---|---|
| 2,539,993 | Davis | Jan. 30, 1951 |
| 2,576,356 | Peterson | Nov. 27, 1951 |
| 2,607,605 | Lines | Aug. 19, 1952 |